(12) United States Patent
Park et al.

(10) Patent No.: US 8,462,130 B2
(45) Date of Patent: Jun. 11, 2013

(54) ORGANIC LIGHT EMITTING DISPLAY HAVING TOUCH SCREEN FUNCTION

(75) Inventors: Chan-Young Park, Yongin (KR); Sung-Kee Kang, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 155 days.

(21) Appl. No.: 13/079,194

(22) Filed: Apr. 4, 2011

(65) Prior Publication Data

US 2012/0105341 A1    May 3, 2012

(30) Foreign Application Priority Data

Oct. 29, 2010    (KR) .................. 10-2010-0106732

(51) Int. Cl.
G06F 3/041    (2006.01)

(52) U.S. Cl.
USPC .......... 345/173; 345/175; 345/76; 178/18.09; 313/506

(58) Field of Classification Search
USPC .......................................... 345/173
See application file for complete search history.

(56) References Cited

U.S. PATENT DOCUMENTS

| | | | | |
|---|---|---|---|---|
| 6,107,731 A * | 8/2000 | Spindt et al. | ............. | 313/495 |
| 2003/0189543 A1* | 10/2003 | Nakayoshi et al. | ............. | 345/98 |
| 2005/0037232 A1* | 2/2005 | Tyan et al. | ............. | 428/690 |
| 2006/0061268 A1* | 3/2006 | Nakanishi | ............. | 313/506 |
| 2007/0024187 A1* | 2/2007 | Shin et al. | ............. | 313/504 |
| 2008/0018613 A1* | 1/2008 | Kim et al. | ............. | 345/173 |
| 2008/0074401 A1* | 3/2008 | Chung et al. | ............. | 345/175 |
| 2008/0121442 A1* | 5/2008 | Boer et al. | ............. | 178/18.09 |
| 2008/0129706 A1* | 6/2008 | Kim et al. | ............. | 345/174 |
| 2008/0150848 A1* | 6/2008 | Chung et al. | ............. | 345/82 |
| 2008/0246905 A1* | 10/2008 | Chen et al. | ............. | 349/106 |
| 2009/0128508 A1* | 5/2009 | Sohn et al. | ............. | 345/173 |
| 2009/0309844 A1* | 12/2009 | Woo et al. | ............. | 345/173 |
| 2010/0231528 A1* | 9/2010 | Wolfe et al. | ............. | 345/173 |
| 2011/0043487 A1* | 2/2011 | Huang et al. | ............. | 345/175 |
| 2011/0096009 A1* | 4/2011 | Kurokawa et al. | ............. | 345/173 |
| 2011/0147773 A1* | 6/2011 | Kostka | ............. | 257/98 |
| 2011/0227873 A1* | 9/2011 | Chung et al. | ............. | 345/175 |
| 2012/0032926 A1* | 2/2012 | Douxchamps et al. | ............. | 345/175 |

FOREIGN PATENT DOCUMENTS

| | | | |
|---|---|---|---|
| JP | 08221198 A * | 8/1996 | |
| KR | 10-0711890 B1 | 4/2007 | |
| KR | 10-2008-0028270 A | 3/2008 | |
| KR | 10-2009-0051613 A | 5/2009 | |
| KR | 10-2009-0129311 A | 12/2009 | |
| WO | WO 2010122865 A1 * | 10/2010 | |

* cited by examiner

*Primary Examiner* — Dorothy Harris (74) *Attorney, Agent, or Firm* — Knobbe, Martens, Olson & Bear LLP (57) ABSTRACT

An organic light emitting display having a touch screen function that includes a transparent substrate and a plurality of thin film transistors formed on the transparent substrate is disclosed. An anode electrode layer is formed above each of the plurality of thin film transistors to be connected to the thin film transistor. Red, green, blue and infrared light emitting layers are formed on adjacent anode electrode layers, respectively. A spacer is formed on the infrared light emitting layer, and the width of the spacer is widened as it approaches from the bottom to top of the spacer. A cathode electrode layer is stacked on the light emitting layers and the spacer. A sealing substrate is positioned above the cathode electrode layer. Accordingly, the organic light emitting display provides an image display function and a touch screen function at the same time.

13 Claims, 6 Drawing Sheets

ORGANIC LIGHT EMITTING DISPLAY HAVING TOUCH SCREEN FUNCTION

RELATED APPLICATIONS

This application claims priority to and the benefit of Korean Patent Application No. 10-2010-0106732, filed on Oct. 29, 2010, in the Korean Intellectual Property Office, the entire content of which is incorporated herein by reference.

BACKGROUND

1. Field

The described technology generally relates to an organic light emitting display, and more particularly, to an organic light emitting display for implementing a touch screen function by using infrared light.

2. Description of the Related Technology

Recently, there have been various types of flat panel displays capable of reducing the weight and volume of cathode ray tubes, which are disadvantages. The flat panel displays include a liquid crystal display, a field emission display, a plasma display panel, an organic light emitting display, and the like.

Among the flat panel displays, the organic light emitting display displays images using an organic light emitting diode (OLED) that emit light through recombination of electrons and holes. The organic light emitting display has a fast response speed and is driven with low power consumption.

Meanwhile, user's demands on the convenience of inputs increase, the organic light emitting display also requires a touch screen function that enables a user's command to be inputted by selecting an instruction content displayed on a screen.

SUMMARY

One inventive aspect is an organic light emitting display for implementing an image display function and a touch screen function at the same time.

Another aspect is an organic light emitting display having a touch screen function, the display including: a transparent substrate; a plurality of thin film transistors formed on the transparent substrate; an anode electrode layer formed above each of the plurality of thin film transistors to be connected to the thin film transistor; red, green, blue and infrared light emitting layers formed on adjacent anode electrode layers, respectively; a spacer formed on the infrared light emitting layer, wherein the width of the spacer is widened as it approaches from the bottom to top of the spacer; a cathode electrode layer stacked on the light emitting layers and the spacer; and a sealing substrate positioned above the cathode electrode layer.

A partial region of the infrared light emitting layer may be exposed between the spacer and the cathode electrode layer stacked on the light emitting layers.

Each of the light emitting layers may include a hole transfer layer, an electron transfer layer and an organic light emitting layer formed between the transfer layers.

The organic light emitting layer in the infrared light emitting layer may be formed at least one selected from the group consisting of organic complexes with trivalent rare-earth ions, ethyne-bridged porphyrin oligomers embedded in a polymer, and Ir(III) complexes with extended systems, and platinum-porphyrin complexes.

The organic light emitting display may further include an infrared camera the photographs an outer surface of the sealing substrate.

The organic light emitting display may further include a sensor substrate formed above the sealing substrate; and a plurality of infrared sensors formed on an inner surface of the sensor substrate, corresponding to the respective infrared light emitting layers.

The sealing substrate may be transparent.

Each of the thin film transistor may include a semiconductor layer formed on the transparent substrate; a gate insulating layer formed on the semiconductor layer; a gate electrode formed to be patterned on the gate insulating layer; an interlayer insulating layer formed on the gate electrode and the gate insulating layer; and source and drain electrodes formed on the interlayer insulating layer and electrically connected to the semiconductor layer through contact holes formed in the gate insulating layer and the interlayer insulating layer.

The anode electrode layer may be connected to the source or drain electrode.

The spacer may be formed in the shape of a reverse trapezoid.

DETAILED DESCRIPTION

In the following detailed description, only certain embodiments have been shown and described, simply by way of illustration. As those skilled in the art would realize, the described embodiments may be modified in various different ways. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter embodiments will be described in detail with reference to the accompanying drawings.

Figure 1:
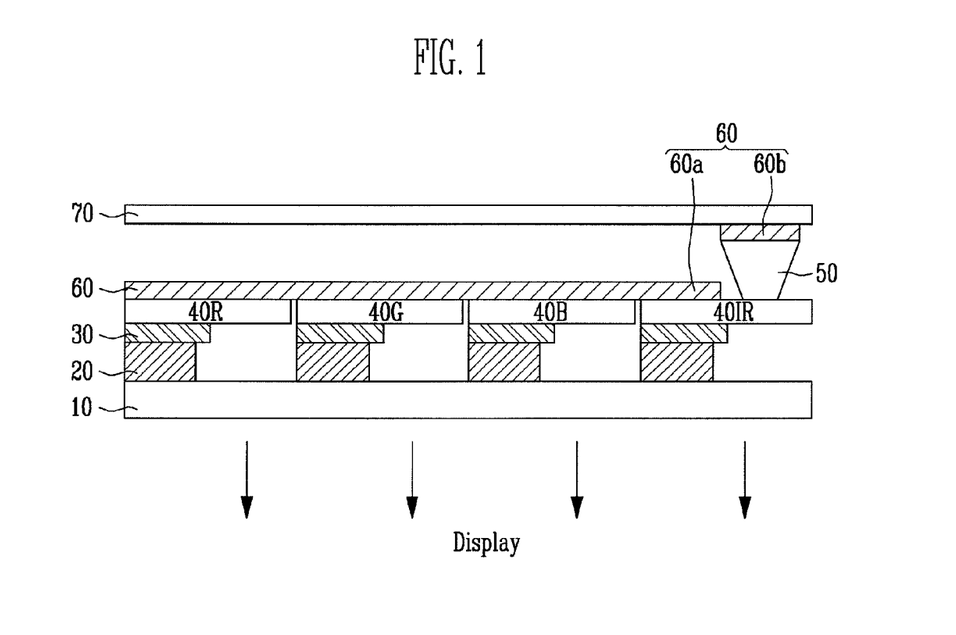
FIG. 1 is a view schematically illustrating an organic light emitting display according to an embodiment.
Figure 2:
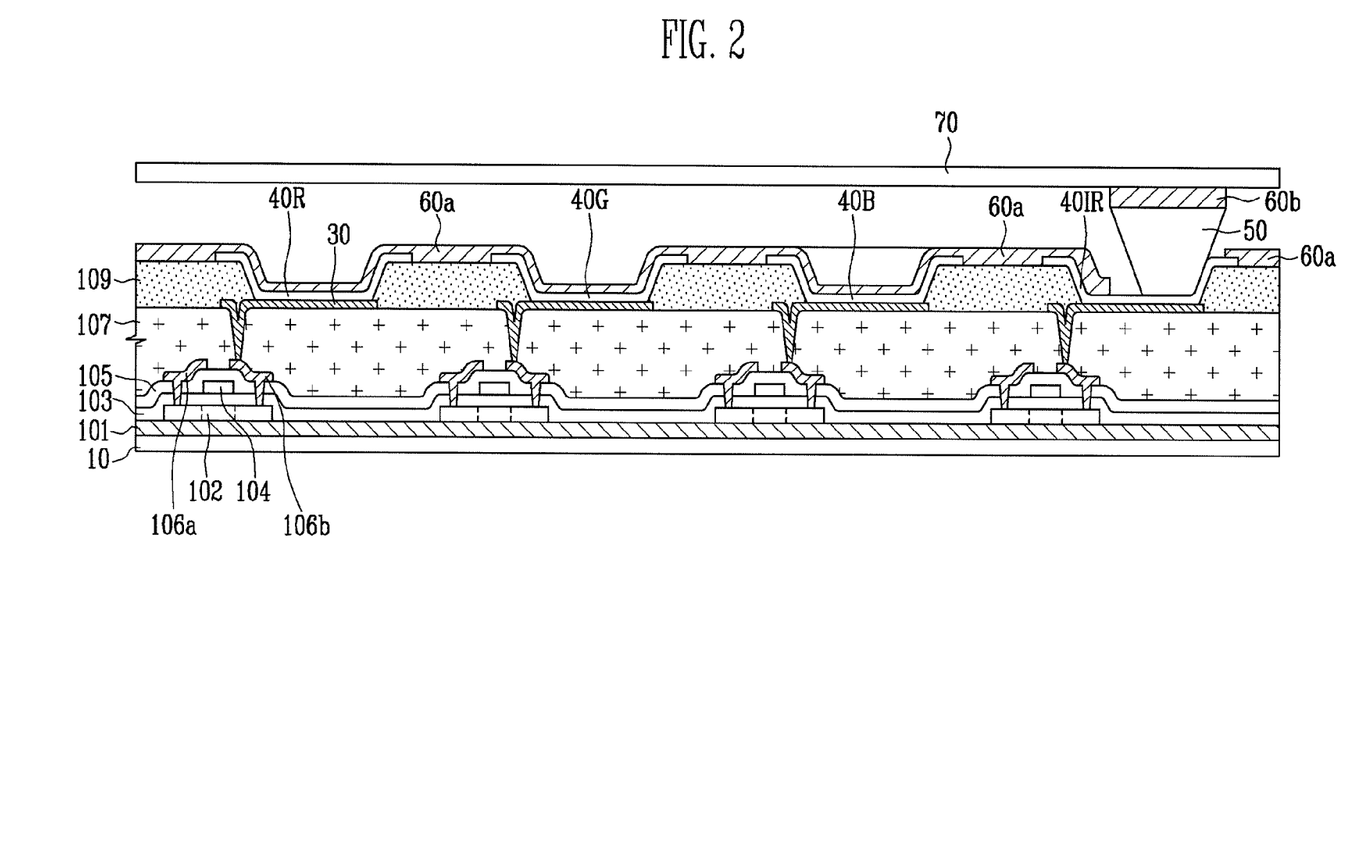
FIG. 2 is a sectional view specifically illustrating the organic light emitting display illustrated in FIG. 1.

FIG. 1 is a view schematically illustrating an organic light emitting display according to an embodiment. FIG. 2 is a sectional view specifically illustrating the organic light emitting display illustrated in FIG. 1. For convenience of illustration, one unit pixel including a red light emitting layer 40R, a green light emitting layer 40G, a blue light emitting layer 40B and an infrared light emitting layer 40IR is illustrated in FIGS. 1 and 2.

Referring to FIGS. 1 and 2, the organic light emitting display according to this embodiment includes a transparent substrate 10, a thin film transistors 20, an anode electrode layer 30, a red light emitting layer 40R, a green light emitting layer 40G a blue light emitting layer 40B, an infrared light emitting layer 40IR, a spacer 50, a cathode electrode layer 60 and a sealing substrate 70.

The transparent substrate 10 may be made of a material having an insulating property, such as glass, plastic, silicon or synthetic resin, for example.

The thin film transistor 20 is formed on the transparent substrate 10 and includes a plurality of thin film transistors corresponding to the respective light emitting layers. Referring to FIG. 2, the thin film transistor 20 includes a semiconductor layer 102, a gate insulating layer 103, a gate electrode 104, an interlayer insulating layer 105 and source/drain electrodes 106a and 106b.

First, a buffer layer 101 may be formed on the transparent substrate 10. The buffer layer 101 is used to prevent the transparent substrate 10 from being damaged by heat and to prevent ions from being spread to the exterior from the transparent substrate 10. In one embodiment, the buffer layer 101 is formed of an insulating layer such as a silicon oxide ($SiO_2$) or silicon nitride ($SiN_x$).

The semiconductor layer 102 is formed in a predetermined pattern on the buffer layer 101. The semiconductor layer 102 may include low temperature poly silicon (LTPS) obtained by crystallizing amorphous silicon deposited on the buffer layer 101 using laser or the like.

The gate insulating layer 103 is formed on the semiconductor layer 102. In one embodiment, the gate insulating layer 103 is made of one of nitride and oxide, e.g., one of silicon oxide and silicon nitride, but is not limited thereto.

The gate electrode 104 is formed in a predetermined pattern on the gate insulating layer 103 having the semiconductor layer 102 formed therebeneath. The interlayer insulating layer 105 is formed on the gate electrode 104. The gate insulating layer 103 and the interlayer insulating layer 105 insulate between the semiconductor layer 102 and the gate electrode 104 and between the gate electrode 104 and the source/drain electrodes 106a and 106b.

The source/drain electrodes 106a and 106b are formed on the interlayer insulating layer 105. The source/drain electrodes 106a and 106b are electrically connected to both sides of the semiconductor layer 102 through contact holes formed in the gate insulating layer 103 and the interlayer insulating layer 105, respectively.

The gate electrode 104 and the source/drain electrodes 106a and 106b may be formed of a metal such as molybdenum (Mo), tungsten (W), titanium (Ti) or aluminum (Al) or an alloy or stacked structure thereof, but is not limited thereto.

A planarization layer 107 is formed on the interlayer insulating layer 105 and the source/drain electrodes 106a and 106b. In one embodiment, the planarization layer 107 is made of one of nitride and oxide, but is not limited thereto.

A via hole is formed in the planarization layer 107 so that a predetermined portion of the source or drain electrode 106a or 106b is exposed. An anode electrode layer 30 electrically connected to the source or drain electrode 106a or 106b through the via hole is formed on the planarization layer 107.

A pixel defining layer 109 is formed on the planarization layer 107 so that a partial region of the anode electrode layer 30. The respective light emitting layers 40R, 40G 40B and 40IR are formed on anode electrode layers 30 adjacent to one another.

The pixel defining layer 109 may be made of one of an acryl-based organic compound and an organic insulating material such as polyamide or polyimide, but is not limited thereto.

The spacer 50 is formed on the infrared light emitting layer 40IR. The spacer 50 is used to expose a partial region of the infrared light emitting layer 40IR. In one embodiment, the spacer 50 has a shape of which width is widened as it approaches from bottom to top of the spacer 50. For example, the spacer 50 may be formed in the shape of a trapezoid.

The spacer 50 may be transparent and made of one of an acryl-based organic compound and an organic insulating material such as polyamide or polyimide, but is not limited thereto.

The cathode electrode layer 60 is stacked on the light emitting layers 40R, 40G 40B and 40IR and the spacer 50. In one embodiment, the stacked cathode electrode layer 60 is discontinuously separated into a first cathode electrode layer 60a and a second cathode electrode layer 60b by the spacer 50. Here, the first cathode electrode layer 60a is formed on the pixel defining layer 109 and the light emitting layers 40R, 40G, 40B and 40IR, and the cathode electrode layer 60b is formed on the spacer 50.

Thus, a partial region of the infrared light emitting layer 40IR is exposed between the spacer and a portion at which the cathode electrode layer 60 is cut, i.e., the first cathode electrode layer 60a formed on the light emitting layers 40R, 40G 40B and 40IR.

The organic light emitting display according to this embodiment has a rear light emitting structure in which light is emitted downward as illustrated in FIG. 1. In this embodiment, at least one of the cathode electrode layers 60a and 60b is formed of a metal layer (e.g., aluminum) that is a reflection layer The sealing substrate 70 is formed above the cathode electrode layer 60 so as to seal the components formed on the transparent substrate 10. A substrate made of a transparent material such as glass may be used as the sealing substrate 70.

In one embodiment, each of the light emitting layers 40R, 40G, 40B and 40IR is formed into a structure in which a hole transfer layer, an organic light emitting layer and an electron transfer layer are stacked. The structure may further include a hole injection layer and an electron injection layer.

Exciters are produced by combining holes injected from the anode electrode layer 30 and electrons injected from the cathode electrode layer 60, and light having a specific wavelength is generated in each of the light emitting layers 40R, 40G, 40B and 40IR by energy generated from the produced exciters.

Thus, the light emitting layers 40R, 40G 40B and 40IR are set to emit red light, green light, blue light and infrared light, respectively.

In one embodiment, in order for the infrared light emitting layer 40IR to emit infrared light, the organic light emitting layer may be formed of at least one selected from the group consisting of organic complexes with trivalent rare-earth ions, ethyne-bridged porphyrin oligomers embedded in a polymer, and Ir(III) complexes with extended systems, and platinum-porphyrin complexes.

Figure 3:
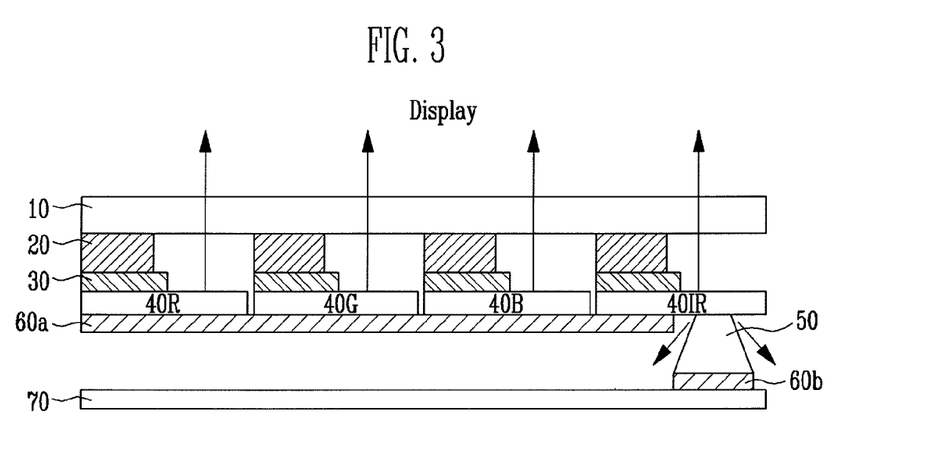
FIG. 3 is a view illustrating a light emission path of light emitted from each light emitting layer according to an embodiment.

FIG. 3 is a view illustrating a light emission path of light emitted from each light emitting layer according to an embodiment. For convenience of illustration, the organic light emitting display illustrated in FIGS. 1 and 2 is turned over upside down, which will be applied to FIGS. 4 and 5 later.

Referring to FIG. 3, each of the light emitting layers 40R, 40G 40B and 40IR emits light having a specific wavelength through the transparent substrate 10 formed thereabove.

Since a partial region of the infrared light emitting layer 40IR is exposed between the spacer 50 and the first cathode electrode layer 60a stacked on the light emitting layers 40R, 40G 40B and 40IR as described above, the infrared light emitting layer 40IR also emits infrared light toward the sealing substrate 70.

Figure 4:
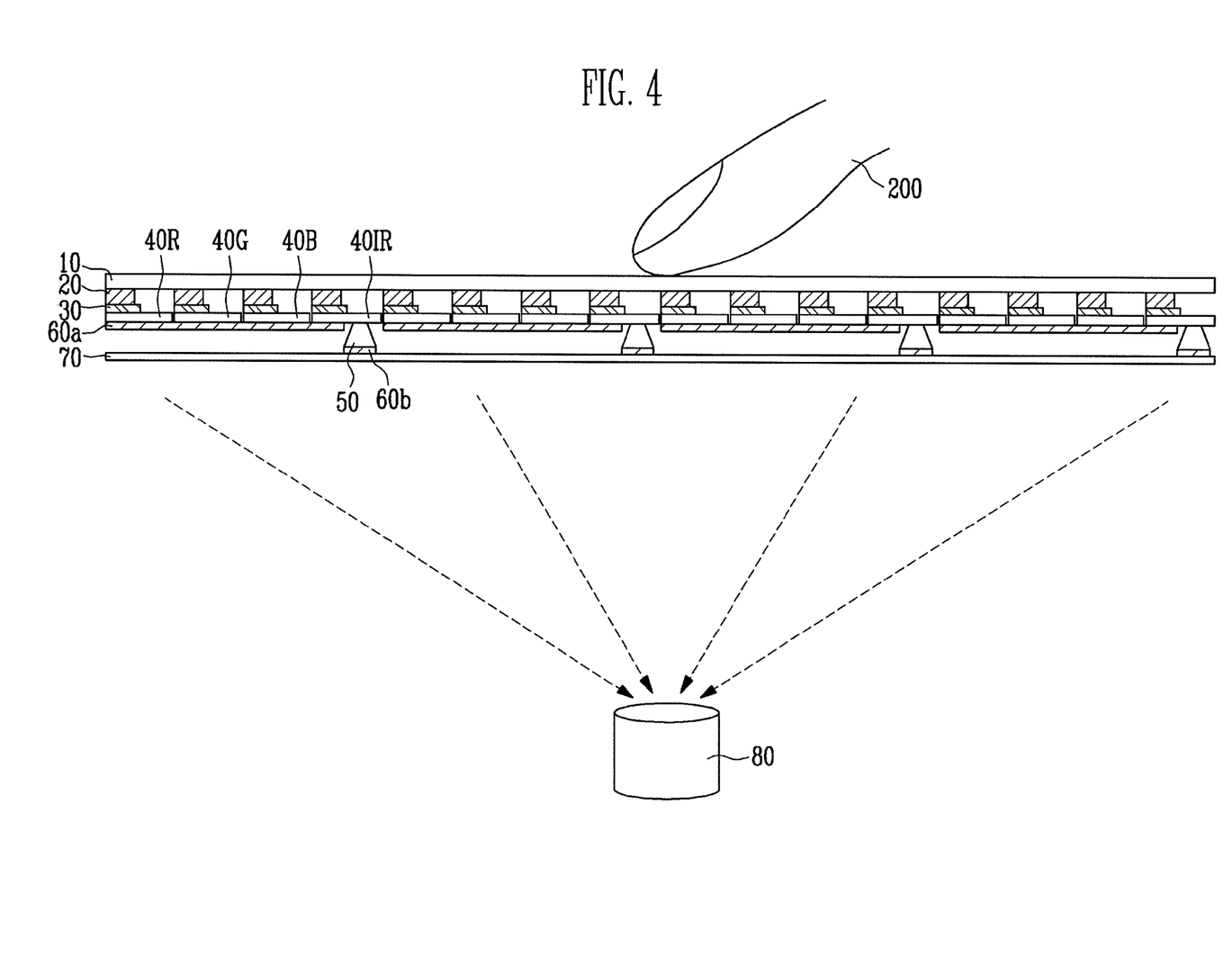
FIG. 4 is a view illustrating an operation of recognizing a touch by using an infrared camera according to an embodiment.

FIG. 4 is a view illustrating an operation of recognizing a touch by using an infrared camera according to an embodiment.

Referring to FIG. 4, the organic light emitting display according to this embodiment further includes an infrared camera 80 so as to sense a touch of an object (e.g., a finger 200) positioned on the transparent substrate 10.

The infrared camera 80 is positioned to be spaced apart from the sealing substrate 70 at a predetermined interval, and photographs an outer surface of the sealing substrate 70.

The organic light emitting display displays an image using light emitted from the respective light emitting layers 40R, 40G and 40B, and emits infrared light through the infrared light emitting layer 40IR at the same time.

If the finger 200 touches a specific position on the transparent substrate 10, the emitted infrared light is reflected by the finger 200 to advance substantially in the opposite direction.

The infrared reflected by the finger 200 is emitted toward the infrared camera 80 by passing between the spacer 50 and the cathode electrode layer 60a stacked on the light emitting layers 40R, 40G, 40B and 40IR and then transmitting the sealing substrate 70.

Thus, the position touched by the finger 200 has higher luminance of the infrared light than other regions in an image photographed by the infrared camera 80 because of the infrared light reflected by the finger 200. Thus, the occurrence of the touch and the position of the touch can be calculated by analyzing the image photographed by the infrared camera 80.

However, since one infrared camera 80 monitors the entire sealing substrate 70, a predetermined space is formed between the infrared camera 80 and the sealing substrate 70. Therefore, the size of the organic light emitting display is increased.

Figure 5:
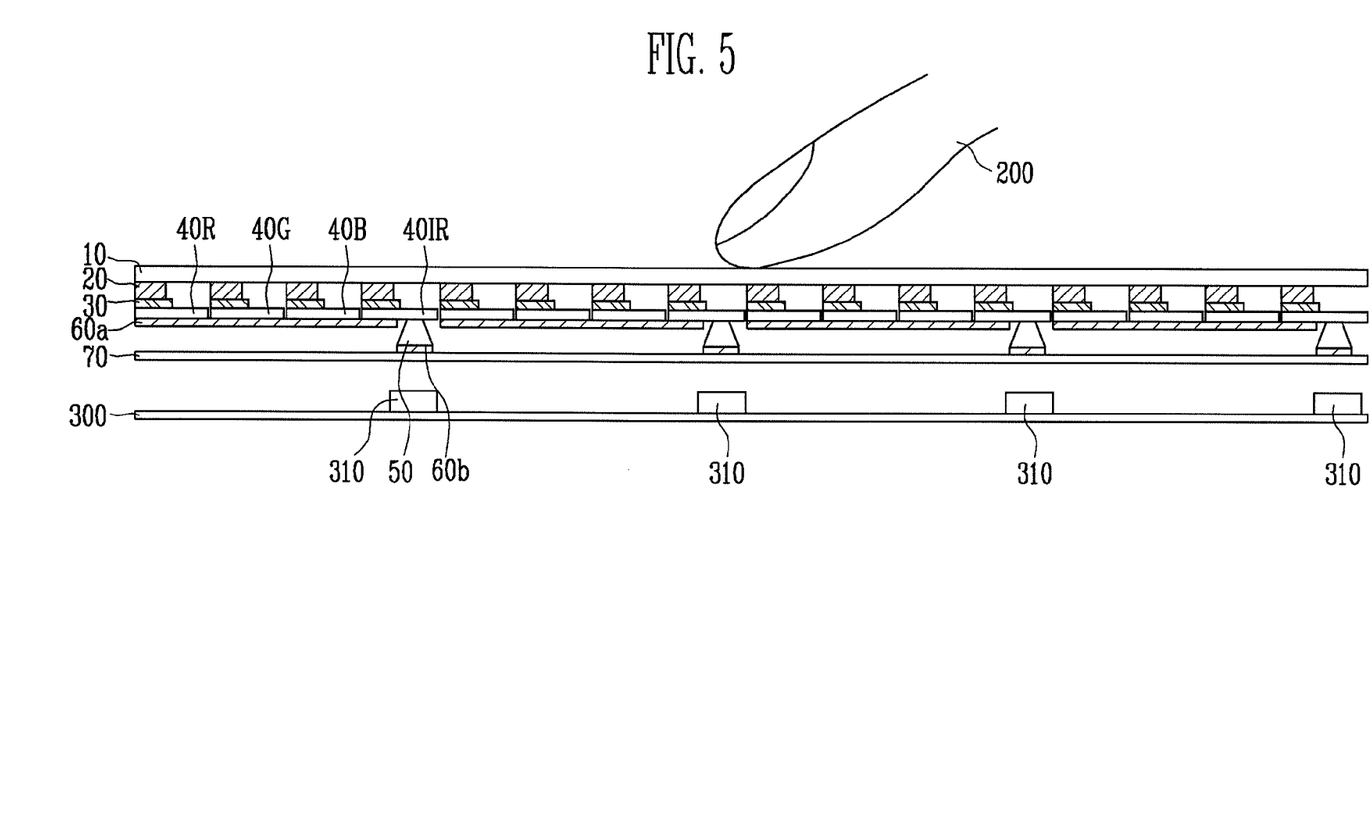
FIG. 5 is a view illustrating an operation of recognizing a touch by using infrared sensors according to an embodiment.

FIG. 5 is a view illustrating an operation of recognizing a touch by using infrared sensors according to an embodiment.

Referring to FIG. 5, the organic light emitting display according to this embodiment further includes a sensor substrate 300 and infrared sensors 310.

The sensor substrate 300 is positioned at the outside of the sealing substrate 70, and the plurality of infrared sensors 310 are formed on the inner surface of the sensor substrate 300.

Each of the infrared sensors 310 is positioned below a corresponding infrared light emitting layer 40IR so as to substantially correspond to each of the infrared light emitting layers 40IR.

In a case where no touch is sensed, each of the infrared sensors 310 senses only infrared light emitted toward the sealing substrate 70 from the infrared light emitting layer 40IR. In a case where the finger 200 touches a specific position on the transparent substrate 10, infrared light reflected by the finger 200 is added to the infrared light emitted from the infrared light emitting layer 40IR, and thus, the amount of infrared light sensed by the infrared sensor 310 is increased.

Thus, the occurrence of the touch and the position of the touch can be precisely determined based on the amount of infrared light sensed by the infrared sensor 310.

The organic light emitting display can be formed thin through the plurality of infrared sensors 310 and the sensor substrate 300, so as to solve the problem that occurs in the embodiment of FIG. 4.

Figure 6:
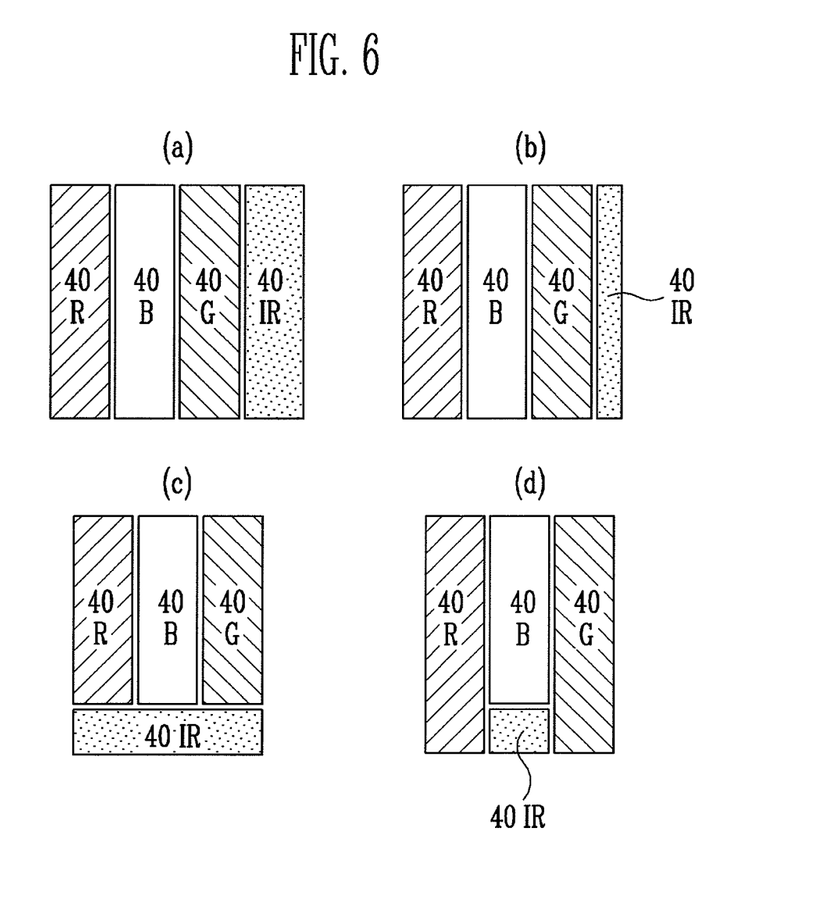
FIG. 6 is a view illustrating shapes of each of the light emitting layers according to an embodiment.

FIG. 6 is a view illustrating shapes of each of the light emitting layers according to an embodiment.

Referring to FIG. 6, each of the light emitting layers 40R, 40G, 40B and 40IR that constitute a unit pixel may be implemented in various forms according to factors such as image luminance and amount of infrared light.

(a) of FIG. 6 is shown as one example in FIGS. 1 to 5, in which the light emitting layers 40R, 40G 40B and 40IR are arranged substantially in parallel and their sizes are identical to one another.

In (b) of FIG. 6, the light emitting layers 40R, 40G 40B and 40IR are arranged substantially in parallel, and the size of the infrared light emitting layer 40IR is formed smaller than that of each of the other light emitting layers 40R, 40G and 40B. As such, the size of the infrared light emitting layer 40IR may be changed.

In (c) of FIG. 6, the light emitting layers 40R, 40G and 40B are arranged substantially in parallel to have substantially the same size, and the infrared light emitting layer 40W is disposed beneath the light emitting layers 40R, 40G and 40B in a different direction from the light emitting layers 40R, 40G and 40B.

In (d) of FIG. 6, the size of one of the light emitting layers 40R, 40G and 40B is decreased, and the infrared light emitting layer 40IR is formed at a portion obtained by decreasing the size of one of the light emitting layers 40R, 40G and 40B. Although the size of the green light emitting layer 40G is decreased in (d) of FIG. 6, the red or blue light emitting layer 40R or 40B may be decreased.

According to at least one of the disclosed embodiments, it is possible to provide an organic light emitting display for implementing an image display function and a touch screen function at the same time.

While the disclosed embodiments have been described with reference to the accompanying drawings, it is to be understood that the disclosed embodiments are not considered limiting, on the contrary, various modifications and equivalent arrangements are included within the spirit and scope of the appended claims, and equivalents thereof.

What is claimed is:

1. An organic light emitting display having a touch screen function, the display comprising:
   a transparent substrate;
   a plurality of thin film transistors formed on the transparent substrate;
   an anode electrode layer formed above each of the thin film transistors to be electrically connected to the thin film transistor;
   red, green, blue and infrared light emitting layers formed on adjacent anode electrode layers, respectively;
   a spacer formed on the infrared light emitting layer, wherein the width of the spacer is widened as it approaches from the bottom to top of the spacer;
   a cathode electrode layer stacked on the light emitting layers and the spacer, wherein the spacer is interposed between and contacts the infrared light emitting layer and part of the cathode electrode layer; and
   a sealing substrate positioned above the cathode electrode layer.

2. The display according to claim 1, wherein each of the light emitting layers comprises a hole transfer layer, an electron transfer layer and an organic light emitting layer formed between the hole transfer layer and the electron transfer layer.

3. The display according to claim 2, wherein the organic light emitting layer of the infrared light emitting layer is formed of at least one selected from the group consisting of organic complexes with trivalent rare-earth ions, ethyne-bridged porphyrin oligomers embedded in a polymer, Ir(III) complexes with extended systems, and platinum-porphyrin complexes.

4. The display according to claim 1, further comprising an infrared camera configured to photograph an outer surface of the sealing substrate.

5. The display according to claim 1, further comprising:
   a sensor substrate formed above the sealing substrate; and
   a plurality of infrared sensors formed on an inner surface of the sensor substrate, substantially corresponding to the respective infrared light emitting layers.

6. The display according to claim 1, wherein the sealing substrate is substantially transparent.

7. The display according to claim 1, wherein each of the thin film transistors comprises:
   a semiconductor layer formed on the transparent substrate;
   a gate insulating layer formed on the semiconductor layer;
   a gate electrode formed to be patterned on the gate insulating layer;
   an interlayer insulating layer formed on the gate electrode and the gate insulating layer; and
   source and drain electrodes formed on the interlayer insulating layer and electrically connected to the semiconductor layer through contact holes formed in the gate insulating layer and the interlayer insulating layer.

8. The display according to claim 7, wherein the anode electrode layer is electrically connected to the source or drain electrode.

9. The display according to claim 1, wherein the spacer is formed in the shape of a reverse trapezoid.

10. The display according to claim 1, wherein the cathode electrode layer comprises 1) a first-sub cathode electrode layer formed on the red, green and blue light emitting layers and a portion of the infrared light emitting layer and 2) a second-sub cathode electrode layer formed on the top of the spacer, and wherein the first-sub cathode electrode layer is spaced apart from the second-sub cathode electrode layer.

11. The display according to claim 10, wherein a gap is formed between the first-sub cathode electrode layer and the spacer.

12. The display according to claim 10, wherein the bottom of the spacer is formed on the remaining portion of the infrared light emitting layer.

13. The display according to claim 10, wherein the width of the first-sub cathode electrode layer is substantially greater than the width of the second-sub cathode electrode layer, and wherein the widths of the first-sub cathode electrode layer and the second-sub cathode electrode layer are measured in a direction substantially parallel with the transparent substrate.

* * * * *